US006703973B1

(12) United States Patent
Nichols

(10) Patent No.: US 6,703,973 B1
(45) Date of Patent: Mar. 9, 2004

(54) GUIDING VEHICLE IN ADJACENT SWATHS ACROSS TERRAIN VIA SATELLITE NAVIGATION AND TILT MEASUREMENT

(75) Inventor: Mark Edward Nichols, Sunnyvale, CA (US)

(73) Assignee: Trimble Navigation, Ltd., Sunnyvale, CA (US)

( * ) Notice: Subject to any disclaimer, the term of this patent is extended or adjusted under 35 U.S.C. 154(b) by 0 days.

(21) Appl. No.: 10/265,534

(22) Filed: Oct. 5, 2002

Related U.S. Application Data

(60) Division of application No. 09/624,313, filed on Jul. 24, 2000, now Pat. No. 6,501,422, which is a continuation-in-part of application No. 09/136,813, filed on Aug. 19, 1998, now Pat. No. 6,104,339.

(51) Int. Cl.[7] ............................. G01S 5/02; H04B 7/185
(52) U.S. Cl. .................................... 342/357.17
(58) Field of Search ..................... 342/357.17

(56) References Cited

U.S. PATENT DOCUMENTS

| | | | | |
|---|---|---|---|---|
| 5,974,348 A | * | 10/1999 | Rocks | .......................... 701/28 |
| 5,987,383 A | * | 11/1999 | Keller et al. | ................. 701/213 |
| 5,991,694 A | * | 11/1999 | Gudat et al. | ................. 701/213 |
| 6,191,732 B1 | | 2/2001 | Carlson et al. | |
| 6,191,733 B1 | | 2/2001 | Dizchavez | |

* cited by examiner

*Primary Examiner*—Theodore M. Blum
(74) *Attorney, Agent, or Firm*—Boris G. Tankhilevich

(57) ABSTRACT

A method of guiding a vehicle in adjacent swaths across terrain that may slope comprising the steps of: (1) determining the tilt of the vehicle with respect to Earth due to a slope of the terrain; (2) determining the position with respect to Earth of a predetermined location that is fixed relative to the vehicle; and (3) using the tilt and position determinations to provide information for guiding the vehicle to prevent gaps and overlaps between adjacent swaths as the slope changes.

5 Claims, 11 Drawing Sheets

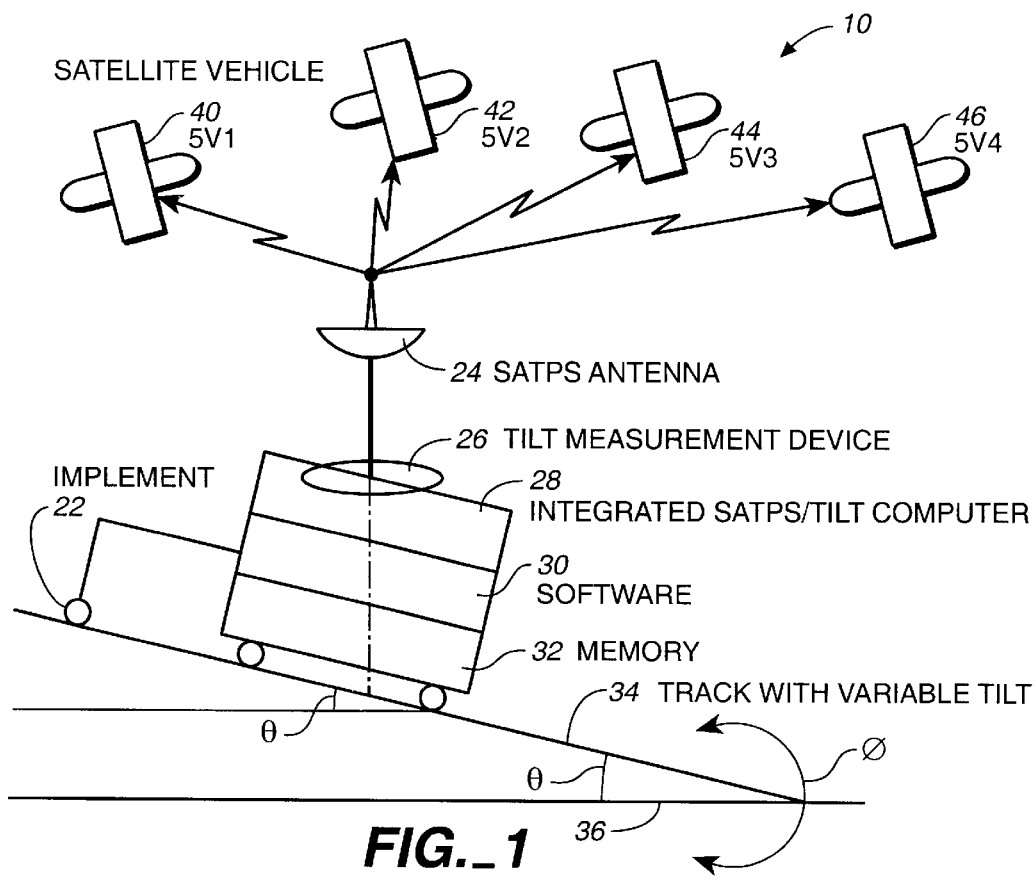
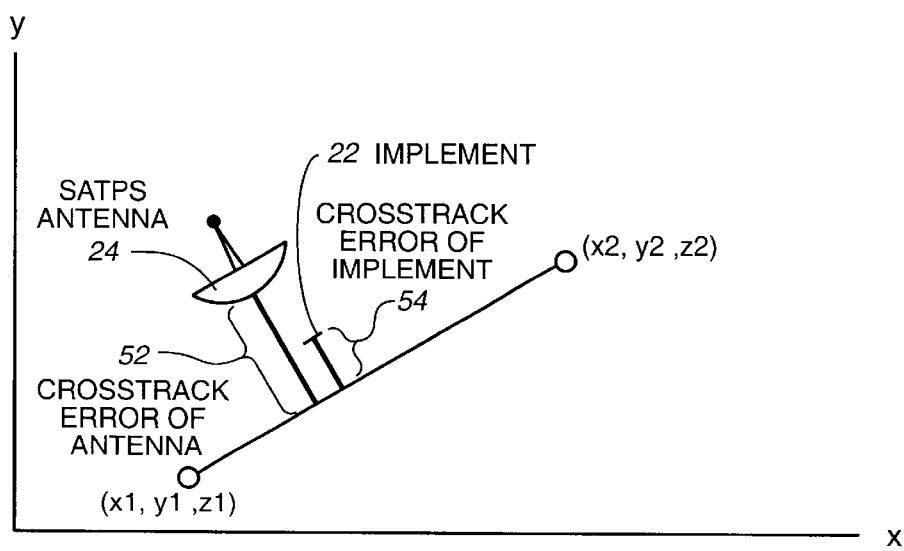

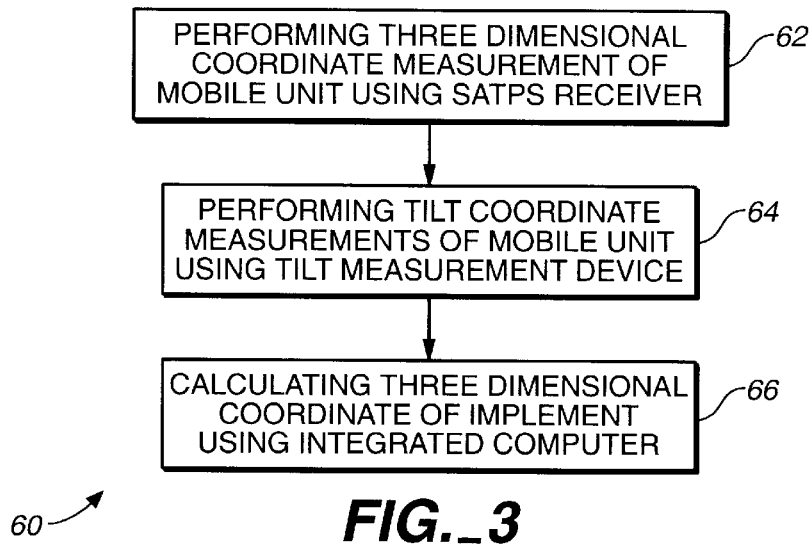
FIG._3
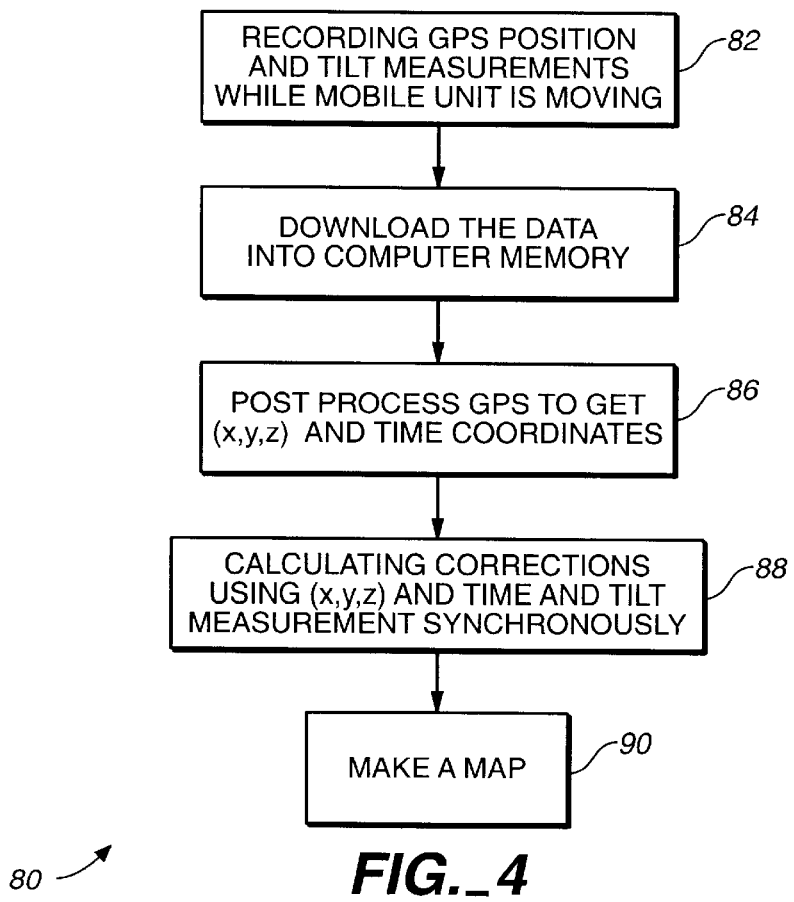
FIG._4

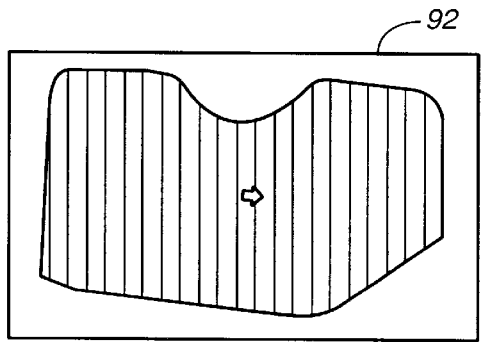
STRAIGHT LINE PARALLEL
GUIDANCE PATTERN
FIG._5A
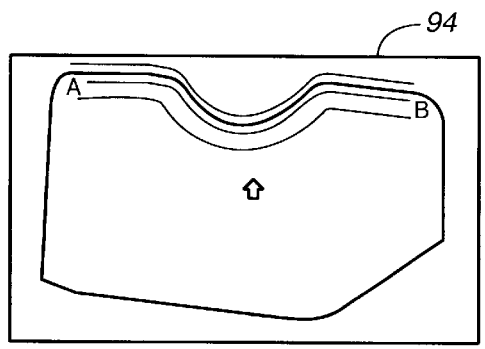
CURVE PARALLEL
GUIDANCE PATTERN
FIG._5B
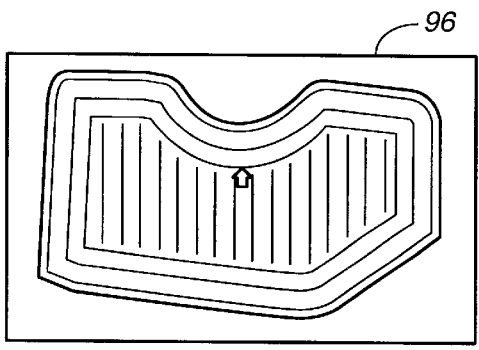
HEADLAND PARALLEL
GUIDANCE PATTERN
FIG._5C
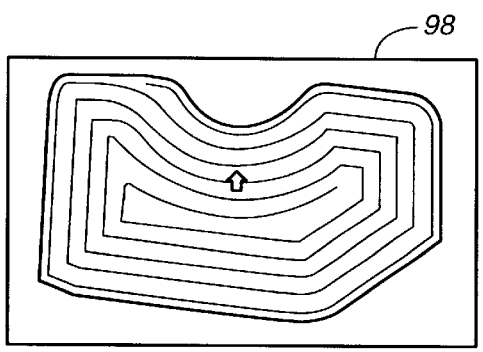
SPIRAL
GUIDANCE PATTERN
FIG._5D

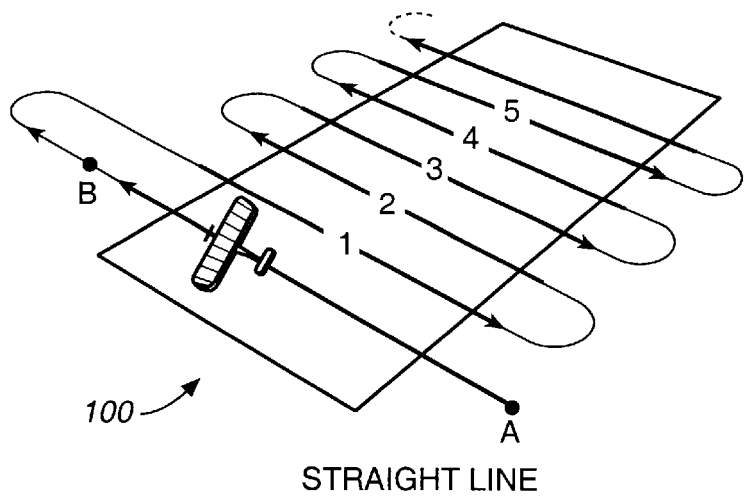
FIG._6A
STRAIGHT LINE
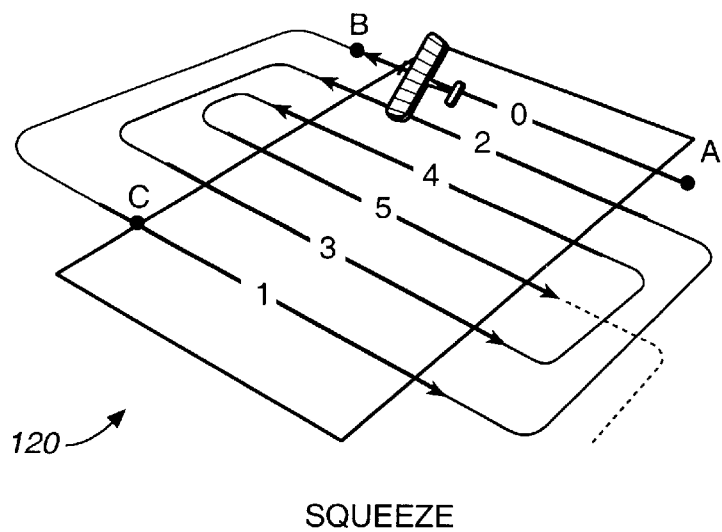
FIG._6B
SQUEEZE

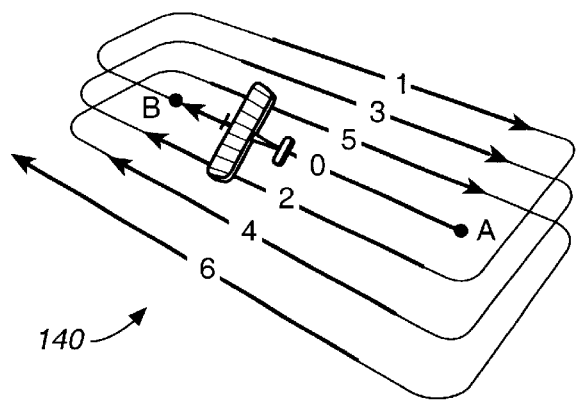
FIG._6C
CROP CIRCLE RACETRACK
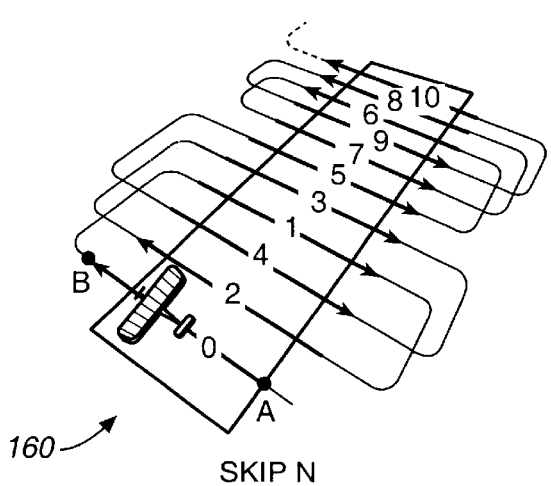
FIG._6D
SKIP N
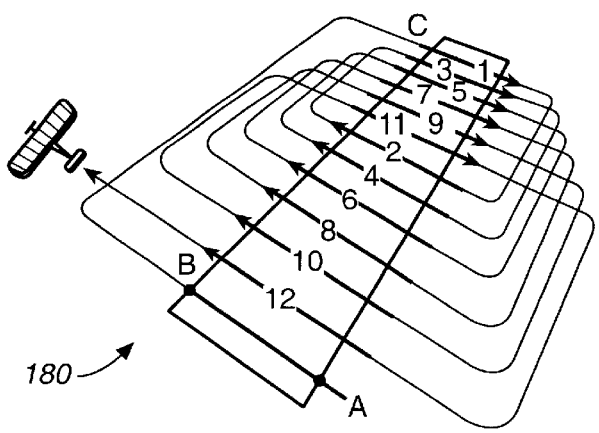
FIG._6E
HALF-FIELD RACETRACK

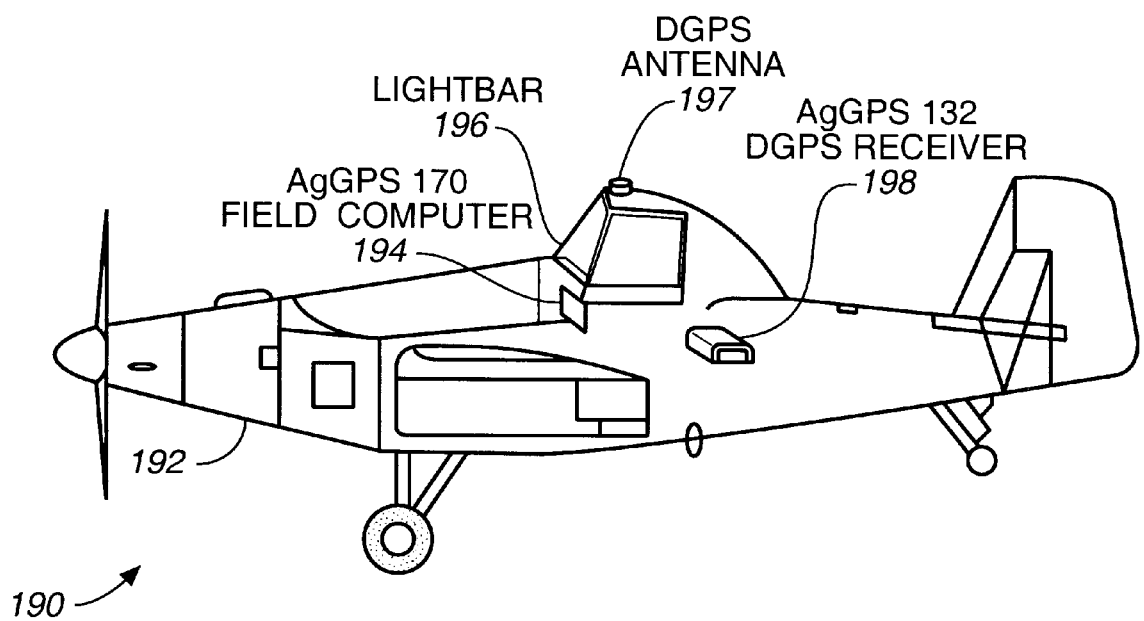
FIG._7A
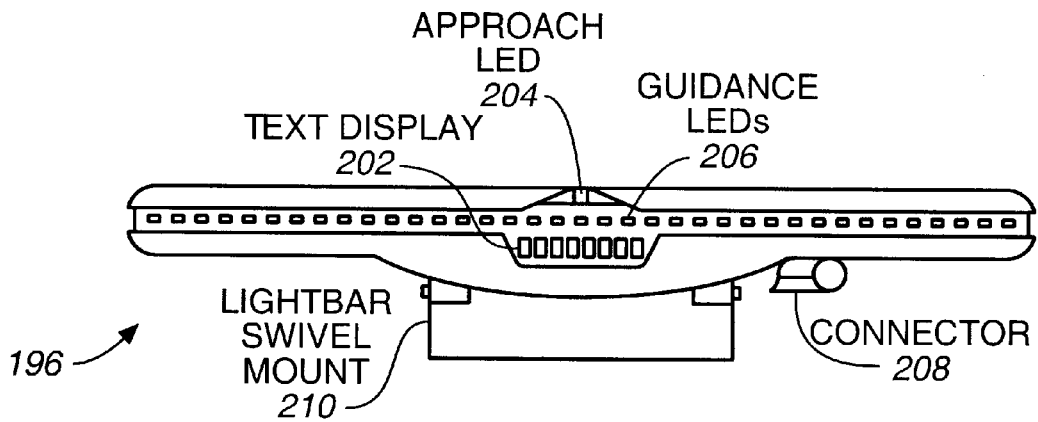
FIG._7B

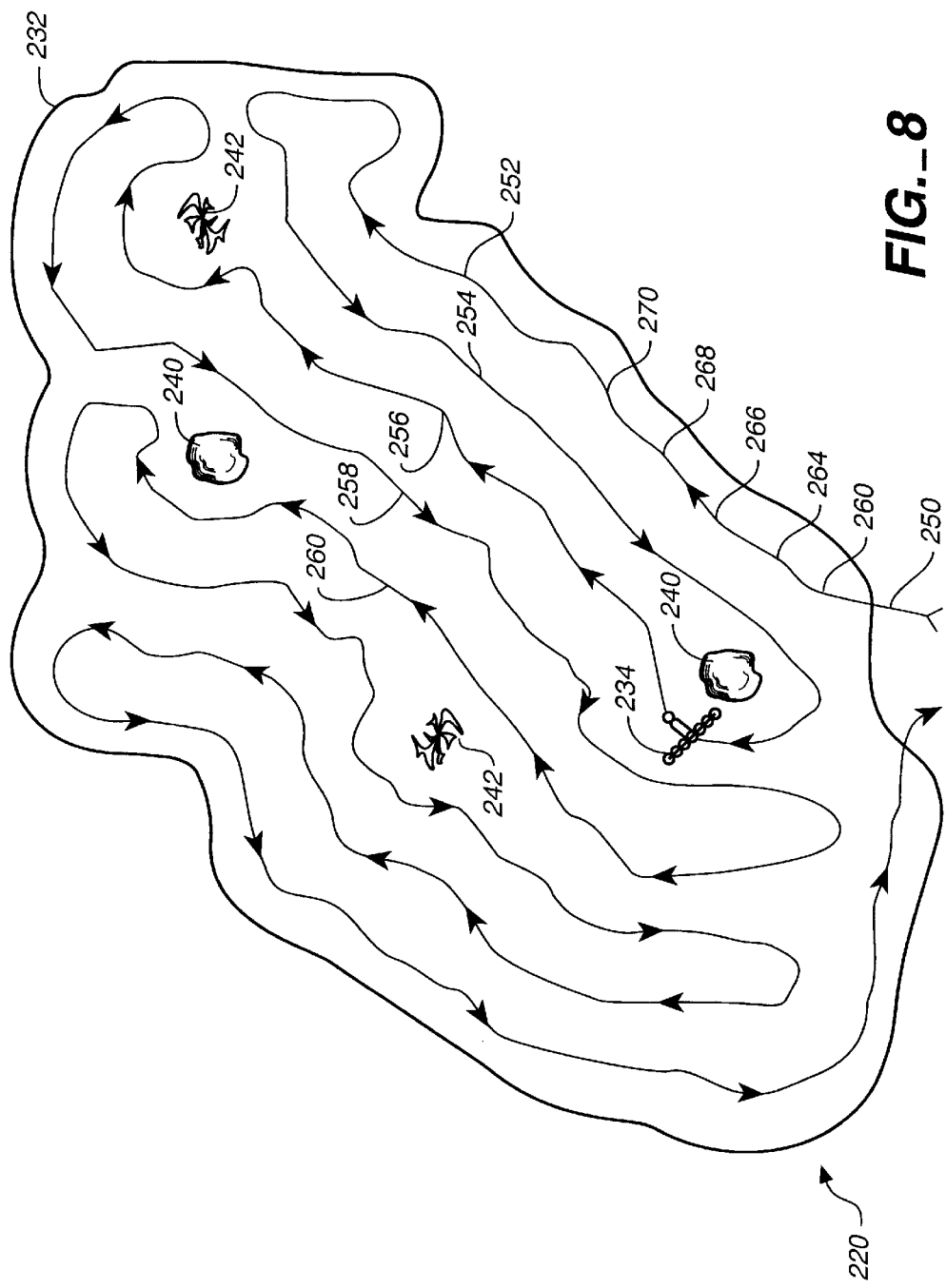
FIG._8

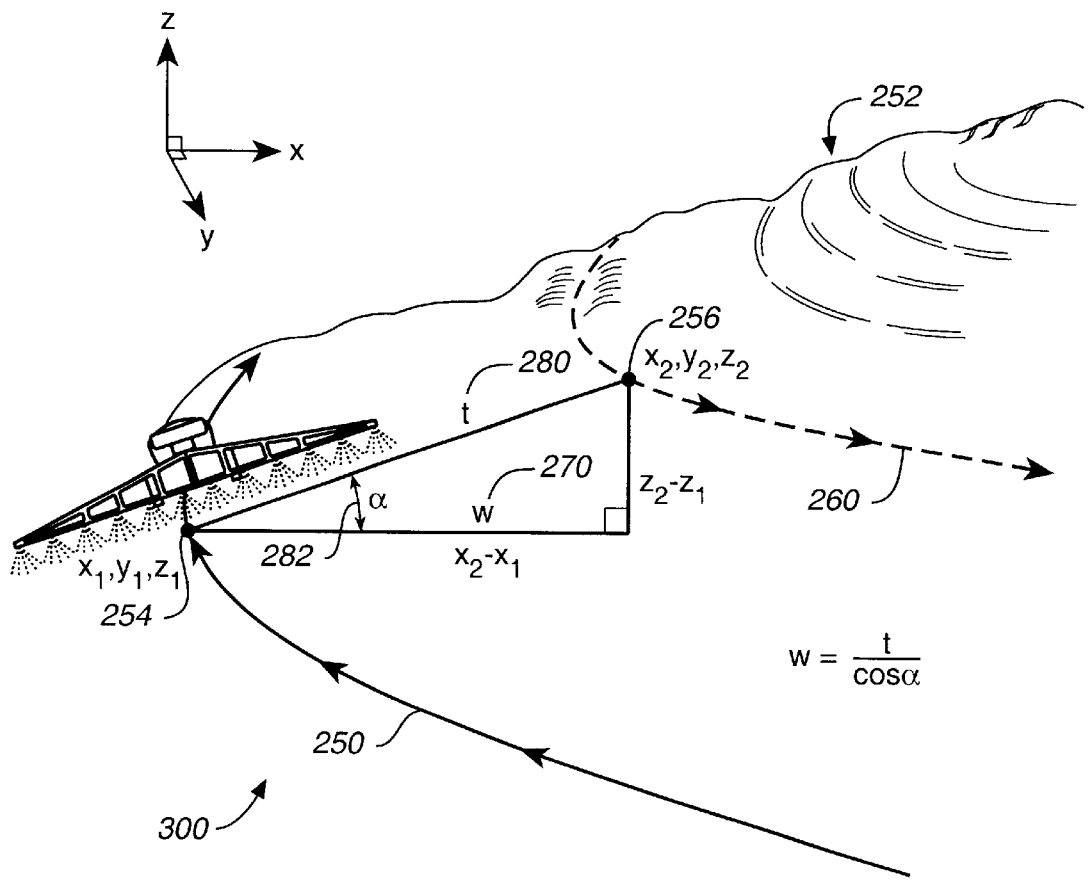
FIG._9

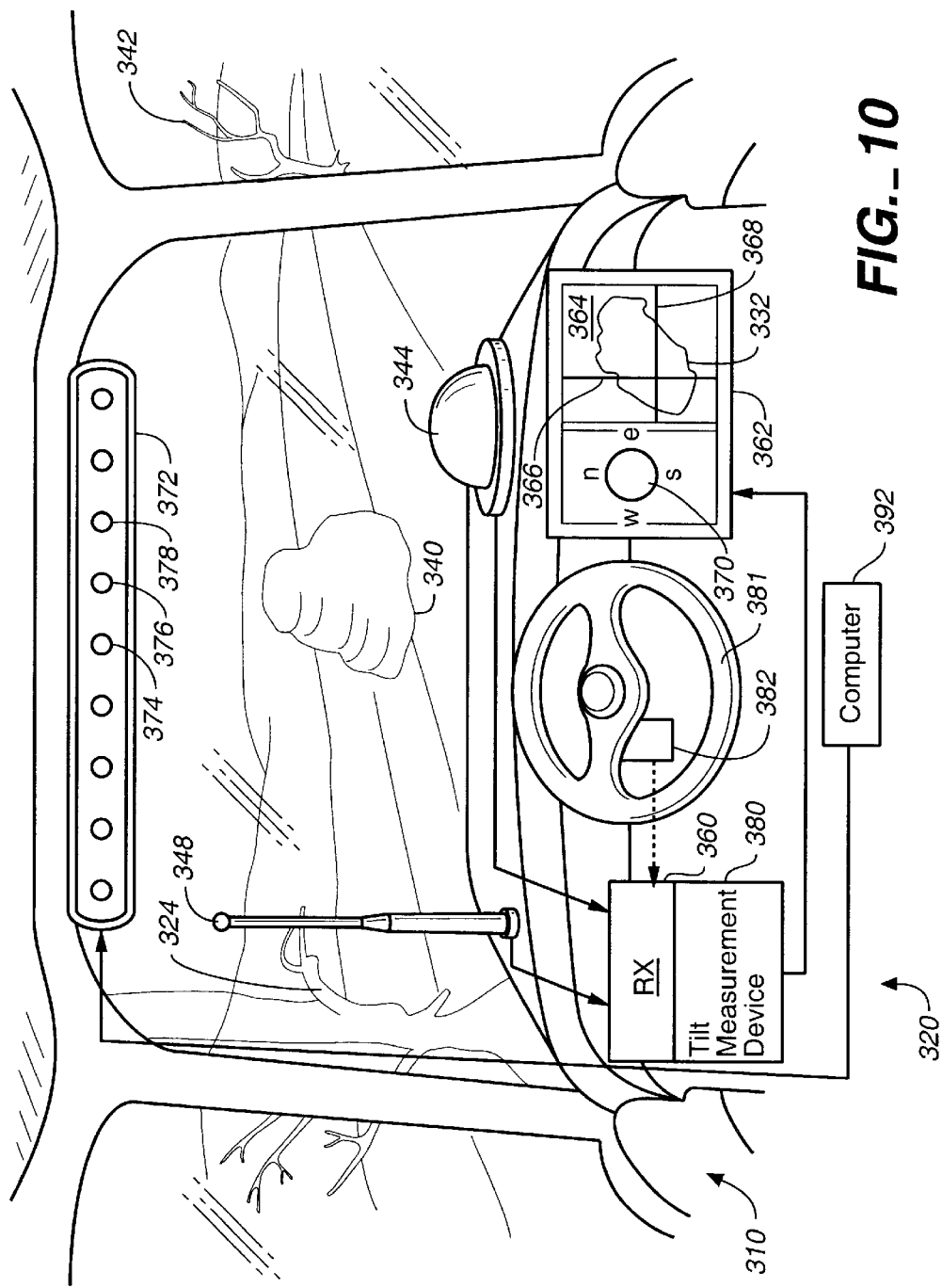
FIG._10

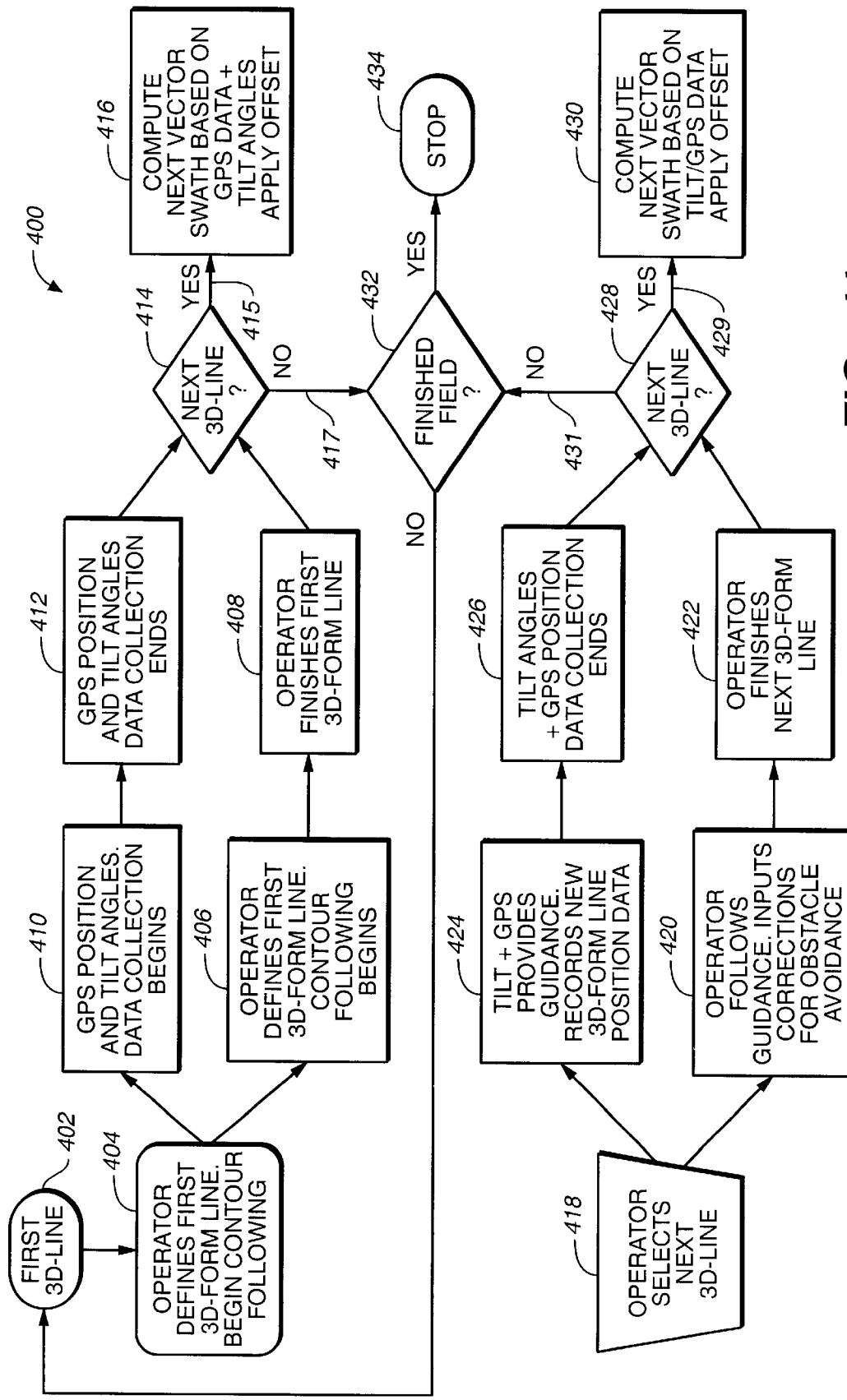
FIG._11

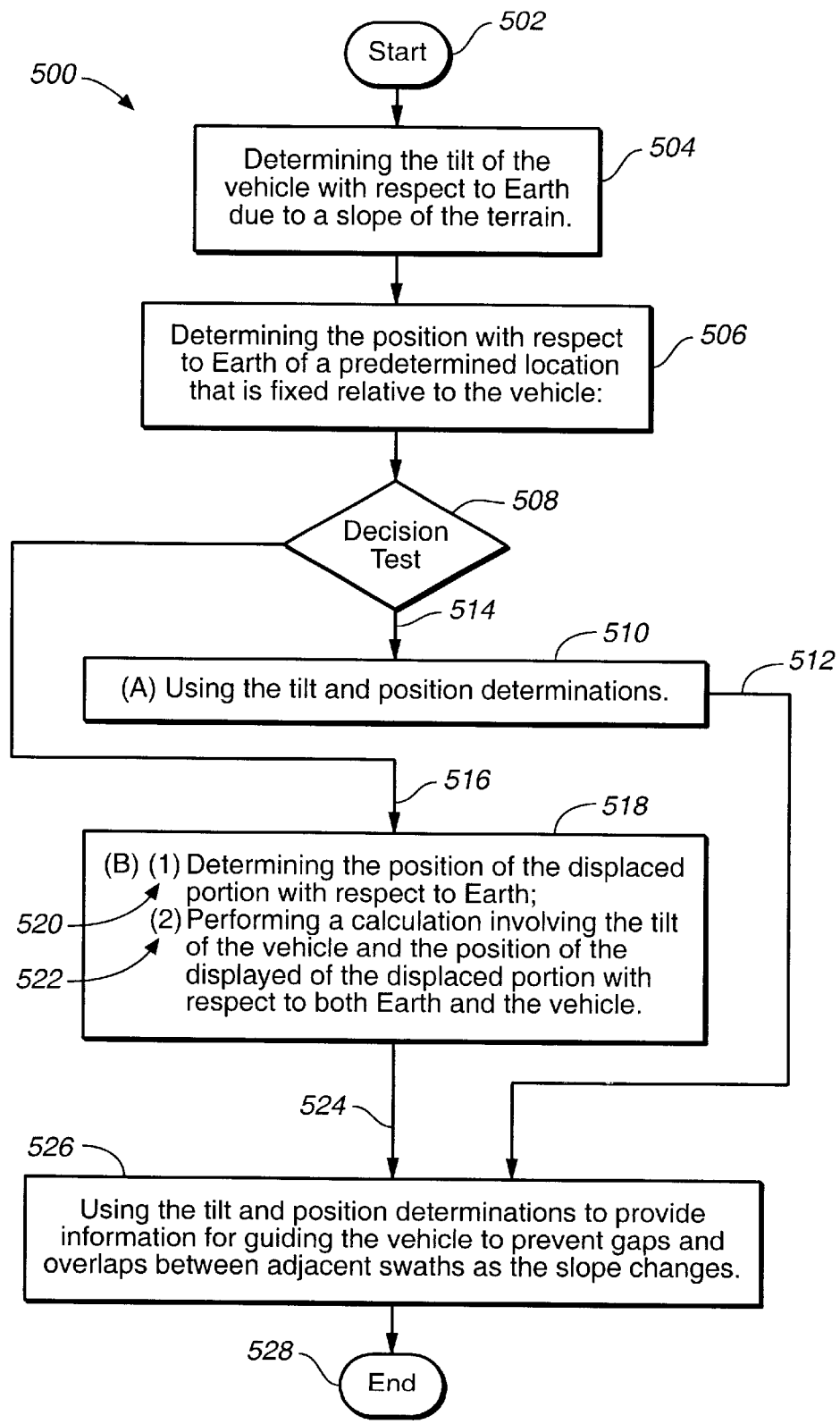
FIG._12

GUIDING VEHICLE IN ADJACENT SWATHS ACROSS TERRAIN VIA SATELLITE NAVIGATION AND TILT MEASUREMENT

This is the divisional patent application for the patent application "PRECISE PARALLEL SWATHING GUIDANCE VIA SATELLITE NAVIGATION AND TILT MEASUREMENT" Ser. No. 09/624,313, filed on Jul. 24, 2000 now U.S. Pat. No. 6,501,422, which is the continuation-in-part patent application for the parent patent application "ALL-TERRAIN ERROR CORRECTION", Ser. No. 09/136,813, filed on Aug. 19, 1998, which is issued as the U.S. Pat. No. 6,104,339.

FIELD OF THE INVENTION

The current invention is in the field of the satellite navigational system.

DESCRIPTION OF THE BACKGROUND ART

In the available art relating to the satellite positional systems (SATPS), the curvature of terrain is not taken into account.

Indeed, the SATPS provides the 3-D location of signal reception (for instance, the 3-D location of the antenna). However, the position of interest is often not the same as where the satellite receiver (SR) is located since the SR is placed in the location for good signal reception. For example, for a tractor towing an implement, the best location for the SR may be on top of the tractor cab, but the position of interest (POI) for providing guidance to the tractor operator may be the position on the ground below the operator. If the tractor is on a flat terrain, determining this POI is a simple adjustment to account for the antenna height. However, if the tractor is on an inclined terrain with a variable tilt, which is often the case, the SATPS alone cannot determine the terrain tilt so the POI also cannot be determined. This results in a guidance error because the POI is approximated by the point of reception (POR), and this approximation worsens as the terrain inclination increases. By measuring tilt of vehicle with inexpensive tilt sensors, the POI can be determined, and the guidance error caused by the tilt of the terrain can be reduced.

In addition, in the prior art satellite guided parallel swathing for precision farming, the actual curvature of terrain is also not taken into account. This results in a less than precise farming because of the less than precise parallel swathing. Indeed, in order to provide parallel swaths through a field, the guidance system collects positions of the vehicle as it moves across the field. When the vehicle turns around at the end of the field and commences the next pass through the field, the guidance system sets the collected positions for the previous pass by the width of the complement (i.e. swath width). If only 3-D coordinates are collected, the next swath computations should assume a flat terrain offset. This set of next swath positions is used to provide guidance to the operator as he drives vehicle through the field. The current vehicle location as compared to the desired swath location is provided to the driver. However, if the terrain is inclined, the horizontal swath offset is in error because it does not take into consideration the curvature of the terrain. On inclined terrain, this error can be minimized by collecting vehicle tilt configuration along each current pass or the previous pass. The swath offset thus becomes a vector taking the terrain inclination into account with the assumption that from the first swath to the next one the terrain inclination does not change too much.

To meet the challenge of taking into account the actual terrain curvature, a satellite navigational system integrated with a tilt measurement system is needed. The integrated system should be capable of precise tilt measurements of the mobile unit that moves along a variable tilt track, so that the actual curvature of terrain is included in the swath vector.

SUMMARY OF THE INVENTION

To address the shortcomings of the available art, the present invention provides a method of using a satellite navigational system integrated with a tilt measurement system in order to guide a vehicle in adjacent swaths across terrain that may slope.

The present invention is directed to a method of guiding a vehicle in adjacent swaths across terrain that may slope. In one embodiment, the method comprises the following steps: (1) determining the tilt of the vehicle with respect to Earth due to a slope of the terrain; (2) determining the position with respect to Earth of a predetermined location that is fixed relative to the vehicle; and (3) using the tilt and position determinations to provide information for guiding the vehicle to prevent gaps and overlaps between adjacent swaths as the slope changes.

In one embodiment of the present invention, the step of determining the position with respect to Earth of a predetermined location further comprises the step of using the tilt and position determinations. In one embodiment, the predetermined location is at ground level.

In one embodiment of the present invention, wherein the vehicle includes a portion that is displaced from the predetermined locations and whose position with respect to the vehicle is known, the step (2) of determining the position with respect to Earth of the predetermined location further comprises the steps of: (2,1) determining the position of the displaced portion with respect to Earth; and (2,2) performing a calculation involving the tilt of the vehicle and the position of the displaced portion with respect to both Earth and the vehicle.

In one embodiment of the present invention, the position is measured with respect to x and y coordinates axes that are horizontal and a z coordinate axis that is vertical.

BRIEF DESCRIPTION OF DRAWINGS

The aforementioned advantages of the present invention as well as additional advantages thereof will be more clearly understood hereinafter as a result of a detailed description of a preferred embodiment of the invention when taken in conjunction with the following drawings.

FIG. 1 depicts a real time positioning system of the present invention.

FIG. 2 shows a cross track error.

FIG. 3 is a flow chart of real time coordinate measurement that is used in the present invention.

FIG. 4 depicts a flow that illustrates the post-processing mode of operation of the system of FIG. 1 including the step of generating a map of actual area covered by the implement.

FIG. 5A illustrates how the GPS guided parallel swathing system that uses the Trimble AgGPS™ 132 receiver in combination with the AgGPS 170 Field computer 170 for precision farming follows a straight line parallel pattern.

FIG. 5B shows how the GPS guided parallel swathing system that uses the Trimble AgGPS™ 132 receiver in combination with the AgGPS 170 Field computer 170 for precision farming follows a curve parallel pattern.

FIG. 5C depicts how the GPS guided parallel swathing system that uses the Trimble AgGPS™ 132 receiver in combination with the AgGPS 170 Field computer 170 for precision farming follows a headland parallel pattern.

FIG. 5D is an illustration of how the GPS guided parallel swathing system that uses the Trimble AgGPS™ 132 receiver in combination with the AgGPS 170 Field computer 170 for precision farming follows a spiral pattern.

FIG. 6A depicts a straight line pattern while using the AgGPS TrimFlight 3 system for precise aerial guidance.

FIG. 6B illustrates a squeeze pattern while using the AgGPS TrimFlight 3 system for precise aerial operations.

FIG. 6C depicts a crop circle racetrack pattern while using the AgGPS TrimFlight 3 system for precise aerial guidance.

FIG. 6D is an illustration of a skip N pattern while using the AgGPS TrimFlight 3 system for precise aerial guidance.

FIG. 6E shows a half-field racetrack pattern while using the AgGPS TrimFlight 3 system for precise aerial guidance.

FIG. 7A depicts the AgGPS TrimFlight 3 system that integrates the AgGPS 132 Flight Bar™ System and the AgGPS 170 Field Computer running software tailored for the aerial market.

FIG. 7B illustrates the AgGPS 132 Flight Bar™ System.

FIG. 8 depicts an overhead view of a plain filed with non-parallel spraying patterns.

FIG. 9 is an overhead view of a 3-dimensional field with curved spaying patterns.

FIG. 10 depicts a 3-dimensional form line following apparatus including a tilt-measurement unit.

FIG. 11 illustrates the method of 3-dimensional line forming using the apparatus of FIG. 10.

FIG. 12 depicts the flow chart that illustrates the method of the present invention for guiding a vehicle in adjacent swaths across terrain that may slope.

DETAILED DESCRIPTION OF THE PREFERRED AND ALTERNATIVE EMBODIMENTS.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention is best understood by focusing on FIG. 1 that shows a positioning system (10) that is used in the present invention to perform a precise measurement of actual coordinates of a mobile unit that moves along a track with variable tilt.

In one embodiment, the positioning system (10) comprises a satellite positioning system (SATPS) receiver. The SATPS receiver including a SATPS antenna (24) is mounted in a housing means of the mobile unit (20). The positioning system (10) additionally includes a tilt angle measurement device (26) integrated with the SATPS receiver. The SATPS receiver is configured to perform three dimensional coordinates measurements of the mobile unit. The tilt measurement device (26) is configured to perform tilt coordinates measurements of the mobile unit (20) that moves along a track (34) with variable tilt. The three dimensional coordinates and the tilt coordinates of the mobile unit are utilized by an integrated SATPS/tilt navigational computer (28) to calculate in real time three dimensional coordinates of an implement (22) mounted in the mobile unit (20). Thus, the cross track error (52 of FIG. 2) of the SATPS antenna (24) and the cross track error of the implement itself (54 of FIG. 2) are eliminated.

There are several well known satellite positioning systems (SATPS). In one embodiment, the satellite based navigational system comprises the GPS (Global Positioning System).

The GPS is a system of satellite signal transmitters, with receivers located on the Earth's surface or adjacent to the Earth's surface, that transmits information from which an observer's present location and/or the time of observation can be determined. The GPS is part of a satellite-based navigation system developed by the United States Defense Department under its NAVSTAR satellite program. A fully operational GPS includes up to 24 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to three or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite continuously transmits two spread spectrum, L-band carrier signals: an L1 signal having a frequency f1=1575.42 MHz (nineteen centimeter carrier wavelength) and an L2 signal having a frequency f2=1227.6 MHz (twenty-four centimeter carrier wavelength). These two frequencies are integral multiplies f1=154 f0 and f2=120 f0 of a base frequency f0=10.23 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

Use of the PRN codes allows use of a plurality of GPS satellite signals for determining an observer's position and for providing the navigation information.

A signal transmitted by a particular GPS satellite is selected by generating and matching, or correlating, the PRN code for that particular satellite. Some of the PRN codes are known and are generated or stored in GPS satellite signal receivers carried by ground observers. Some of the PRN codes are unknown. A first known PRN code for each GPS satellite, sometimes referred to as a precision code or P-code, is a relatively long, fine-grained code having an associated clock or chip rate of 10 f0=10.23 MHz. A second known PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=10.23 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision B-PR, Jul. 3, 1991, which is incorporated by reference herein.

The GPS satellite bit stream includes navigational information on the ephemeris of the transmitting GPS satellite (which includes a complete information about the transmitting satellite within next several hours of transmission) and an almanac for all GPS satellites (which includes a less detailed information about all other satellites). The satellite information transmitted by the transmitting GPS has the parameters providing corrections for ionospheric signal propagation delays suitable for single frequency receivers and for an offset time between satellite clock time and true GPS time. The navigational information is transmitted at a rate of 50 Baud.

In another embodiment, the SATPS system comprises a Global Navigational System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9k/16) GHz and f2=(1.246+7k/16) GHz, where k (=1,2, ... 24) is the channel or satellite number. These frequencies lie in two bands at 1.597–1.617 GHz (L1) and 1,240–1,260 GHz (L2). The L1 code is modulated by a C/A- code (chip rate=0.511 MHz) and by a P-code (chip rate=5.11 MHz). The L2 code is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

A satellite positioning system (SATPS), such as the GPS, the GLONASS, or the combination of GPS and GLONASS systems uses transmission of coded radio signals, with the structure described above, from a plurality of Earthorbiting satellites. An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS satellites.

The range (Ri) between the location of the i-th SATPS satellite and the SATPS receiver is equal to the speed of light c times ($\Delta$ti), wherein ($\Delta$ti) is the time difference between the SATPS receiver's clock and the time indicated by the satellite when it transmitted the relevant phase. However, the SATPS receiver has an inexpensive quartz clock which is not synchronized with respect to the much more stable and precise atomic clocks carried on board the satellites. Consequently, the SATPS receiver actually estimates not the true range Ri to the satellite but only the pseudo-range (ri) to each SATPS satellite.

After the SATPS receiver determines the coordinates of the i-th SATPS satellite by picking up transmitted ephemeris constants, the SATPS receiver can obtain the solution of the set of the four equations for its unknown coordinates ($x_0$, $y_0$, $z_0$) and for unknown time bias error (cb). The SATPS receiver can also obtain its heading and speed. The following discussion is focused on a GPS receiver, though the same approach can be used for a GLONASS receiver, for a GPS/GLONASS combined receiver, or any other SATPS receiver.

Thus, the SATPS receiver of FIG. 1 can comprise: (a) a GPS receiver, (b) a GLONASS receiver; or (c) a combined GPS/GLONASS receiver. In one embodiment, when the accuracy of the mobile unit position measurement is not important, the GPS receiver of FIG. 1 can comprise an autonomous GPS receiver that can be implemented using a single frequency Ag 132 GPS TRIMBLE receiver. The autonomous receiver utilizes the absolute positioning method to obtain its position with an accuracy of 10–100 meters.

In another embodiment, when the accuracy of the mobile unit position measurement is important, the GPS receiver of FIG. 1 can comprise a differential GPS receiver. In this embodiment, a configuration of two or more receivers can be used to accurately determine the relative positions between the receivers or stations. In differential position determination, many of the errors in the GPS signals that compromise the accuracy of absolute position determination are similar in magnitude for stations that are physically close. The effect of these errors on the accuracy of differential position determination is therefore substantially reduced by a process of partial error cancellation. Thus, the differential positioning method is far more accurate than the absolute positioning method, provided that the distances between these stations are substantially less than the distances from these stations to the satellites, which is the usual case. Differential positioning can be used to provide location coordinates and distances that are accurate to within a few centimeters in absolute terms.

In the real time embodiment, the differential GPS receiver can include: (a) a real time code differential GPS, or (b) a real-time kinematic (RTK) differential GPS that includes a code and carrier RTK differential GPS receiver.

The differential GPS receiver can obtain the differential corrections from different sources. In one embodiment, the differential GPS receiver can obtain the differential corrections from a Reference (Base) Station. The fixed Base Station (BS) placed at a known location determines the range and range-rate measurement errors in each received GPS signal and communicates these measurement errors as corrections to be applied by local users. The Base Station (BS) has its own imprecise clock with the clock bias $CB_{BASE}$. As a result, the local users are able to obtain more accurate navigation results relative to the base station location and the base station clock. With a proper equipment, a relative accuracy of <1 meter should be possible at distances of a few hundred kilometers from the Base Station.

In another embodiment, the differential GPS receiver can be implemented by using a TRIMBLE Ag GPS-132 receiver that obtains the differential corrections from the U.S. Cost Guard service free in 300 kHz band broadcast. The accuracy of this differential GPS method is about 50 cm. In one more embodiment, the differential corrections can be obtained from the Wide Area Augmentation System (WAAS). The WAAS system includes a network of Base Stations that uses satellites (initially geostationary satellites -GEOs) to broadcast GPS integrity and correction data to GPS users. The WAAS provides a ranging signal that augments the GPS, that is the WAAS ranging signal is designed to minimize the standard GPS receiver hardware modifications. The WAAS ranging signal utilizes the GPS frequency and GPS-type of modulation, including only a Coarse/Acquisition (C/A) PRN code. In addition, the code phase timing is synchronized to GPS time to provide a ranging capability. To obtain the position solution, the WAAS satellite can be used as any other GPS satellite in satellite selection algorithm. The WAAS provides the differential corrections free of charge to a WAAS-compatible user. The accuracy of this method is less than 1 meter.

In one more embodiment, three satellite commercial services that broadcast the differential corrections can be used: (1) Omnistar, (2) Racal, (3) Satloc, and (4) the satellite system operated by the Canadian Government. The accuracy of this method is (10–50) cm.

In one more embodiment, the real time kinematic (RTK) differential GPS receiver can be used to obtain the position locations with less than 2 cm accuracy. The RTK differential GPS receiver receives the differential corrections from a Base Station placed in a know location within (10–50) km from the local user. For the high accuracy measurement, the number of whole cycle carrier phase shifts between a particular GPS satellite and the RTK GPS receiver is resolved because at the receiver every cycle will appear the same. Thus, the RTK GPS receiver solves in real time an "integer ambiguity" problem, that is the problem of determining the number of whole cycles of the carrier satellite signal between the GPS satellite being observed and the RTK GPS receiver. Indeed, the error in one carrier cycle L1 (or L2) can change the measurement result by 19(or 24) centimeters, which is an unacceptable error for the centimeter-level accuracy measurements.

Referring still to FIG. 1, positioning system (10) further includes a tilt angle measurement device (26). In one embodiment, the tilt angle measurement device (26) further comprises an electronic tilt measurement device. The Precision Navigation, Inc., (PNI) based in Mountain View, Calif., manufactures TCM2 Electronic Compass Sensor Module. TCM2 is a high-performance, low-power electronic compass sensor that offers compass heading, pitch and roll through an electronic interface to host system. This high end system provides a robust heading reference system that can be easily integrated with a GPS navigational system. The Precision Navigation, Inc., (PNI) also manufactures a low end, low cost Vector -VR Head Positioning Sensor that provides a 3 DOF attitude sensor whose combination of tilt-performance, low-power, and low-cost makes it ideally suited for tilt-measurement applications.

In one embodiment, the tilt measurement device (26 of FIG. 1) can comprise a single angle measurement device that can determine the heading of the mobile unit if the relationship between the single angle coordinate and the direction of the movement of the mobile unit is known. In this embodiment, the single tilt angle can comprise a pitch angle only or a roll angle only. In another embodiment, the tilt measurement device (26 of FIG. 1) can comprise a dual angle measurement device that can determine the heading of the mobile unit if the relationship between the dual angle coordinates and the direction of the movement of the mobile unit is known. In this embodiment, the dual tilt angles can comprise a combination of pitch and roll angles.

In one embodiment, the heading of the mobile unit can be determined by obtaining a first set of three dimensional coordinates of the GPS receiver at a first location of the mobile unit, obtaining a second set of three dimensional coordinates of the GPS receiver at a second location of the mobile unit, and computing the heading of the GPS receiver by utilizing the first set of three dimensional coordinates measurements at the first second location of the mobile unit and the second set of three dimensional coordinates measurements at the second location of the mobile unit. In another embodiment, the heading of the GPS receiver can be determined by utilizing a standard magnetic compass.

Referring still to FIG. 1, the system (10) further includes a GPS/tilt integrated navigational computer (28) configured to calculate three dimensional coordinates of the mobile unit. Thus, the positioning system (10 of FIG. 1) can perform the precision guidance of the implement (22 of FIG. 1) by compensating for the cross track error of implement (54 of FIG. 2) in a variable tilt terrain (like a field).

FIG. 3 is a flow chart 60 of real time coordinate measurement using the positioning system (10 of FIG. 1) that is used in the present invention. The flow chart 60 of FIG. 3 comprises the following steps. At first, three dimensional coordinates measurements of the mobile unit are performed by using the GPS receiver mounted in a housing means of the mobile unit (step 62 of FIG. 3). In the next step (step 64 of FIG. 3), tilt coordinates measurements of the mobile unit are performed by using the tilt angle measurement device integrated with the GPS receiver. Finally (step 66 of FIG. 3), three dimensional coordinates of an implement mounted in the mobile unit are calculated by utilizing the three dimensional coordinates and the tilt coordinates of the mobile unit.

The step of performing tilt coordinates measurements further comprises the step of determining the relationship between tilt coordinates and the heading of the mobile unit. In one embodiment, the step of performing tilt coordinates measurements of the mobile unit includes the step of synchronizing the tilt coordinates measurements with a GPS clock, so that both the tilt coordinates measurements and the three dimensional coordinates of the mobile unit can be measured at the same time.

The actual three dimensional coordinates of the implement can be obtained by solving a set of geometrical equations using the GPS/tilt integrated navigational computer (28 of FIG. 1). The set of equations (1–3) that connects the three dimensional coordinates of the mobile unit (X1, Y1, Z1), the tilt coordinates ($\theta$) (36 of FIG. 1) and ($\Phi$) (35 of FIG. 1) of the mobile unit, and the distance R between the GPS receiver and the implement coordinates (X2, Y2, Z2), is as follows:

$$X2 = X1 + R \sin(\Phi) \sin(\theta); \quad (1)$$

$$Y2 = Y1 + R \cos(\Phi)\sin(\theta); \quad (2)$$

$$Z2 = Z1 + R \cos(\theta). \quad (3)$$

The GPS/tilt integrated positioning system (10 of FIG. 1) allows one to lower the cost of manufacturing the positioning system by using a single integrated unit instead of combing two independent navigational systems: a satellite navigational system and a tilt measurement system. The GPS/tilt integrated positioning system (10 of FIG. 1) ensures the user that the tilt measurements and the mobile unit coordinates measurements are made synchronously and in real time.

However, the cost of purchasing the differential corrections can be substantial, about $1,000 per year. Also, the cost of the high end, real time differential GPS receiver may be very substantial. To lower the cost of the system (10) of FIG. 1, the user, instead of performing real time measurements of the implement moving in a variable tilt environment, can obtain a map of the actual area covered by the implement. In this embodiment, the lower cost post-processing GPS differential receiver can be used and the need of purchasing the real-time differential corrections can be eliminated. Thus, in the map generating embodiment of the present invention, a map generating system (10 of FIG. 1) comprises: a post-processing differential GPS receiver (24) mounted in a housing means of a mobile unit, a tilt angle measurement device (26) integrated with the GPS receiver, a GPS/tilt integrated navigational computer (28), and a memory unit (32) configured to record three dimensional coordinates of the implement in order to generate a map of an actual area covered by the implement (22 of FIG. 1).

In one embodiment, a flow chart (60 of FIG. 3) illustrates the real time operation of system (10 of FIG. 1). In the first step (62), the three dimensional coordinates measurements of a mobile unit are performed by using a low cost post-processing GPS receiver mounted in a housing means of the mobile unit. In the next step (64 of FIG. 3), the tilt coordinates measurements of the mobile unit are performed synchronously with the three dimensional coordinates measurements of the mobile unit by using the tilt angle measurement device integrated with the post-processing differential GPS receiver. In the next step (66 of FIG. 3), the three dimensional coordinates of the implement mounted in the mobile unit are calculated by solving a set of geometrical equations including the three dimensional coordinates of the mobile unit, the tilt angle coordinates of the mobile unit, and a distance between the GPS antenna and the POI by using a GPS/tilt integrated navigational computer.

The post-processing mode of operation of the system (10 of FIG. 1) is depicted in the flow chart (80) of FIG. 4. In the step (82), the GPS positions and tilt measurements of the mobile unit are recorded by using a memory unit of the GPS/tilt integrated navigational computer while the mobile unit is moving along the filed. In the step (84) the data recorded in the step (82) is downloaded into computer memory. In the step (86) the recorded data is post processed to get positions and time coordinates. In the step (88) the cross track corrections are calculated using the post processed position and time coordinates. Finally, in the step (90) of FIG. 4) a map of an actual area covered by the implement is generated by using a map generating software.

To perform guided parallel swathing for precision farming, the operator has to enter the width of the swath and mark the beginning and end of the first swath into the guidance system. On the next and all remaining swaths, an offline indicator (i.e. light bar), shows how far left or right the operator's location is to the desired path and allows the operator to steer on-line. When the mobile unit turns at the end of a row, guidance system automatically begins guidance down the next swath. If the operator leaves the field in mid swath and pause/resume function guides the mobile unit back to the location last worked, so that the operator can begin swathing again.

FIGS. (5A–5D) illustrate how the GPS guided parallel swathing system that uses the Trimble AgGPS™ 132 DGPS receiver (198 of FIG. 7A) in combination with AgGPS 170 Field Computer (194 of FIG. 7A) for precision farming can follow different filed patterns, like straight line parallel (92 of FIG. 5A), curve parallel (94 of FIG. 5B), headland parallel (96 of FIG. 5C), and spiral (98 of FIG. 5D).

FIG. 7 A shows an advanced integrated aerial guidance system AgGPS TrimFlight 3 190 that integrates AgGPS 132 DGPS receiver 198 and AgGPS 170 Field Computer 194 running software tailored for the aerial market. The AgGPS TrimFlight 3 system provides highly accurate guidance suitable for precise aerial operations. As depicted in FIGS. (6A–6E), the AgGPS TrimFlight 3 system allows a pilot to do the aerial spraying while flying different patterns. FIG. 7B depicts the light bar 196 (of FIG. 7A) in more details.

The U.S. Pat. No. 5,987,383, issued to Keller et al. and assigned to the Assignee of the present patent application, discloses a precision farming guidance and/or control system for terrestrial spraying applications which may be used in an open field 220 with non-parallel spraying patterns as illustrated in FIG. 8. '383 patent is incorporated herein in its entirety.

More specifically, FIG. 8 depicts a sprayer rig 234 in proximity to a rock 240 within field 220. As shown by the guidance path information presented as guidance path 250, sprayer rig 234 should follow a spraying path through field 220 which accommodates not only the contours of the field but also the various terrain features and obstacles presented therein. For example, sprayer rig 234 should avoid the rocks 240 and trees 242 and yet still follow the guidance path 250 which allows for precise application of the various chemicals.

Sprayer (or floater) rig 234 is equipped with a boom which allows delivery of a variety of crop protection products, conventional chemicals and/or liquid fertilizers. Examples of the crop protection products may include herbicides, pesticides, etc. The crop protection products or other chemicals or fertilizers are generally stored in a tank assembly (not shown) and are delivered through nozzles (not shown) which are present in boom assembly (not shown). Various controls in the cab of sprayer rig 234 allow an operator to control the flow of chemicals in tank assembly through boom and nozzles, thus allowing the operator to apply such chemicals where needed.

Thus, for optimal applications of the crop protection products, like chemicals or fertilizers, the various form lines 252, 254, 256, etc of guidance path 250 should be separated by approximately the effective spraying width of boom assembly 234. The offset is sometimes referred to as a swathing offset or a swath width and ensures that all areas of filed 220 are adequately (but not overly) covered by the spraying assembly as the chemicals are being applied.

The guidance path 250 is such as to accommodate operator inputted corrections for deviations around obstacles such as rocks 240 and trees 242. That is, after the first form line 252 is traversed by sprayer rig 234, a return path (form line 254) is computed which allows for an offset by approximately the width boom assembly 234. However, at various points along form line 254, operator inputted corrections, such as those required to deviate around rock 240, will be input (e. g., through a steering wheel). Thus, when computing the next form line (form line 256), these operator inputted deviations should be accounted for.

FIG. 9 is an overhead view 300 of a 3-dimensional field with curved spaying patterns. The method of form line following, disclosed in '383 patent, can be used for harvesting, ploughing, planting, mining, mineral prospecting, or other applications where real-time correction information should be applied to previously computed guidance paths. The method of form line following includes defining a first form line using two or more terrestrial locations. A second form line is defined using the positioning data and a swathing offset. In general, the swathing offset corresponds to the width of a spraying pattern (i. e., a boom width). In other cases, the swathing offset takes into account varying elevations which may be encountered, for example, when applying fertilizers, etc. over a filed which includes a hillside or other sloping terrain. The second form line is followed and updated according to one or more deviations. The deviations may correspond to user inputted corrections to accommodate one or more terrain features encountered during the spraying operations. GPS data may be collected during the steps of following and deviating from the computed second form line path and one or more positions computed therefrom. An updated second form line may than be defined using the computed positions.

'383 patent also discloses a form line following apparatus that includes a vehicle including a satellite receiver configured to receive satellite data and satellite correction information and to compute position information. A processor (which may be part of the satellite receiver or a separate unit) is configured to receive the position information and to compute form line following information therefrom and is further configured to update the form line following information in response to form line deviation information. The form line following guidance system of '383 patent may be supplemented with non-satellite based guidance systems and methodologies, such as inertial navigation systems, distance and gyro compass and/or other heading indicator systems, laser range finding and bearing indicator systems, etc. Such systems are particular useful in situations where satellite-based positioning signals are unavailable (e. g., under foliage, behind hills or buildings, in valleys, mines, etc.).

The actual terrain can have a substantial curvature that has to be taken into account for the purposes of the precision farming. Indeed, as shown in FIG. 9, the path 250 of FIG. 8 can include the patterns 254 and 256 that are lying on different planes of the terrain. Therefore, the 3-dimensional coordinates (x, y, z) have to be assigned to each point in order to take into account the real curvature of the terrain, and a "plane" swathing distance 'w' 270 should be replaced by a 3-dimensional swathing distance 't' 280 as follows:

$$w=t/\cos(\alpha): \quad (4)$$

wherein a is a 3-dimensional slope angle, that can actually include two angles: a horizontal slope angle (i. e. roll), and a longitudinal slope angle (i. e. pitch).

If this is the case, on the return path, the sprayer rig needs to be guided to a position 256 which is offset from position 254 by the 3-dimensional swathing distance t 280. The system of '383 patent will have computed $x_1$ and $z_1$ while the sprayer rig was traveling along form line 250. Further, positions $x_2$ and $Z_2$ will be computed from GPS data received while the sprayer rig is traveling along the second form line 260. But, by the time the sprayer rig reaches position 256 and computes $x_2$ and $z_2$, the sprayer rig will have already passed position 256. Thus, the guidance information will be late. Therefore, the prior art satellite-guided parallel swathing system used for precision farming, including the system of '383 patent, can be adequately used for precise farming in a non-plain terrain environment.

The method for 3-dimensional line forming can be performs by using a satellite navigational system integrated with a tilt measurement system (10 of FIG. 1) which allows a real-time measurement of tilt angles and therefore a real-time adjustments for the curvature of a non-plain terrain.

FIG. 10 illustrates the basic features of a 3-dimensional form line following apparatus 320. FIG. 10 is drawn from the stand point of an operator console within sprayer rig. However, it will be appreciated by those skillful in the art that other embodiments with varying configurations may also be used.

The 3-dimensional form line following apparatus 329 includes a satellite receiver 360. Satellite receiver 360 can include a GPS navigational receiver, a GLONASS navigational receiver, or a GPS/GLONASS combined navigational receiver. In one embodiment, the satellite receiver 360 includes a GPS receiver. In this embodiment, the 3-dimensional form line following apparatus 320 of the present invention includes a GPS antenna 344 which is mounted on sprayer rig so as to have a clear view of the sky. This will ensure that antenna 344 is capable of capturing signals from GPS satellites. Signals fro antenna 344 are provided to GPS receiver 360 which may be mounted inside the cab of sprayer rig or at another convenient location on the vehicle. Receiver 360 may also receive differential GPS correction information through antenna 348 from a GPS base station situated near the field 332. This practice is common in the GPS arts. Alternatively, GPS receiver 360 may also receive differential GPS correction information from FM subcarrier broadcasts or from other sources. (See detailed discussion above).

Referring still to FIG. 10, the 3-dimensional form line following apparatus 320 further includes a tilt angle measurement device 380. In one embodiment, the tilt angle measurement device 380 comprises an electronic tilt angle measurement device TCM2 Electronic Compass Sensor Module, manufactured by the Precision Navigation, Inc., (PNI), based in Mountain View, Calif.

In one embodiment, the tilt measurement device (380 of FIG. 10) can comprise a single angle measurement device that can determine the heading of the mobile unit if the relationship between the single angle coordinates and the direction of the movement of the mobile unit is known. In this embodiment, the single tilt angle can comprise a pitch angle only or a roll angle only. In another embodiment, the tilt measurement device (380 of FIG. 10) can comprise a dual angle measurement device that can determine the heading of the mobile unit if the relationship between the dual angle coordinates and the direction of the movement of the mobile unit is known. In this embodiment, the dual tilt angle can comprise a combination of pitch and roll angles.

In one embodiment, the heading of the cab of sprayer rig 310 can be determined by obtaining a first set of three dimensional coordinates of the GPS receiver 360 at a first location of the sprayer rig, obtaining a second set of three dimensional coordinates of the GPS receiver 360 at a second location of the sprayer rig, and computing the heading of the GPS receiver by utilizing the first set of three dimensional coordinates of the GPS receiver 360 at the first location of the sprayer rig and the second set of three dimensional coordinates of the GPS receiver 360 at the second location of the sprayer rig. In another embodiment, the heading of the GPS receiver 360 can be determined by utilizing a standard magnetic compass 370.

Referring still to FIG. 10, the 3-dimensional line forming further includes a GPS/tilt integrated navigational computer 392 configured to calculate three dimensional positional information for the sprayer rig. The three dimensional positional information of the sprayer rig corresponds to the terrestrial location of sprayer rig at the time the GPS data is collected. Such position computations may occur periodically, for example, several times each second. Using differential GPS correction techniques common in the art, submeter position accuracy may be obtained. In an alternative embodiment, GPS receiver 360 may be configured to operate with real-time kinematic (RTK) corrections which provide centimeter level accuracy.

The three dimensional positional information of the sprayer rig is configured to define an updated 3-dimensional form line according to the set of position information computed while the sprayer rig was (a) following a previously computed 3-dimensional form line having been defined using positioning data derived from an earlier received set of satellite navigational data, from an earlier generated set of tilt measurement data, and from a swathing offset vector )swathing offset 280, angle α 282 including a pitch angle, and a roll angle), and (b) deviating for the previously computed 3-dimensional form line to accommodate one or more terrain features and/or one or more operator's errors.

The positron information computed by computer 392 is processed and provided to a display device 362. The display device 362 may include a moving map display 364 which allows an operator to determine the precise location of sprayer rig 310 with respect to the boundaries of field 332. As illustrated, field 332 has some irregular boundaries and the intersection of cross-hairs 366 and 368 defines the position of sprayer rig 310 within field 332. It is well known to those skilled in the art how to generate such moving map display information.

In one embodiment, the 3-dimensional form line following apparatus includes a multi-function light bar 372. The multi-function light bar 372 receives guidance information from computer 382 and provides clear and immediate guidance information/commands to an operator of sprayer rig 310 through a row of light emitting diodes (LEDs). These LEDs are used to alert an operator when the sprayer rig has deviated from a computed 3-dimensional form line path. The sensitivity of light bar 372 (i. e., the deviation required before an LED will be illuminated to indicate that sprayer rig 310 is deviating from the computed 3-dimensional path.) may be operator configured for various types of spaying operations and field conditions. In addition, the light bar 372 may have a text screen (nor shown) to display user selected information such a s the form line number, sprayer rig speed, flow rate, etc. In an alternative embodiment of the present invention, multi-function light bar 372 nay be replaced by a liquid crystal or other display device configured to provide similar course guidance and/or correction information.

During spraying operations, LED 374 will be lit when sprayer rig 310 is following a computed 3-dimensional form line path as described below. As sprayer rig 310 deviates from the computed form line path, offset indicator LEDs 376, 378, etc. will be lit to indicate the degree (or distance) of deviation from the computed path. LEDs 376, 378, etc. will be lit if sprayer rig 310 deviates to the right of the computed path and corresponding LEDs on the other side of LED 374 will be lit if sprayer rig deviated to the left of the computed path. The times at which the LEDs will be lit may be user configured. For example, LED 376 may be lit when sprayer rig 310 has deviated by two to three feet from the computed form line. Then, if sprayer rig 310 continues to deviate, for example to five feet from the computed form line path, LED 378 may be lit. In other situations, LED 376 may not be lit until a five foot deviation has been recognized.

In this way, the user is provided with information which allows him or her to correct the path of sprayer rig 310 back to that of the computed form line.

Operator corrections and steering controls are input through steering wheel 380. The 3-dimensional form line following apparatus may be included with a steering input option which allows steering commands to be transmitted from a steering apparatus 382 to computer 392. Steering apparatus 382 provides information regarding the steering input through steering wheel 380 so that the computer 392 can be provided with real-time update information (e. g., the above-described deviations). Using the various steering commands provided through steering input apparatus 382, computer 392 can provide appropriate display information to display device 362 and light bar 372. In other embodiments, other heading sensors such as a gyro compass or flux-gate gyro compass may provide the update information to computer 392. If no steering information is used, the 3-dimensional form line following apparatus may rely on updated position information derived from GPS data received from satellites to compute and provide the display information.

FIG. 11 illustrates the method 400 of 3-dimensional line forming using the apparatus 320 of FIG. 10. At the first step (402 of FIG. 11), an operator begins the first 3-dimensional form line. In one embodiment, at the next step (404 of FIG. 11), the operator defines the first 3-dimensional form line as sprayer rig is driven across field using the 3-dimensional form line following apparatus 320 of FIG. 10, including GPS receiver 360, and tilt measurement device 380 to collect and store position information and tilt data. In the alternative embodiment, the first 3-dimensional form line is defined by downloading a previously computed 3-dimensional form line map from a stored map database generated by digitizing an aerial photograph of field. Alternatively, such a map may be obtained from a geographical information structure (GIS) which also contains information on other aspects of field as described further below.

However, the operator will more precisely define the first 3-dimensional form line by driving across the actual field (or at least over that portion of field that is to be sprayed), e.g., following a fence line, a crop boundary line or a natural contour in the land, at step 406. This process finishes at step 408 when the first 3-dimensional form line path has been completed. During this process, GPS data and tilt angle data is collected at a variety of geographical locations at step 410. Then, at step 412, the GPS data and tilt angle data collection ends when the first 3-dimensional form line has been completed.

Referring still to FIG. 11, the decision is made at step 414 of whether additional 3-dimensional form lines should be sprayed. If the answer is yes (logical arrow 415), the computer 392 of FIG. 10 computes a new 3-dimensional form line to be followed, based on the GPS data and tilt angle data collected while sprayer rig traversed across the first 3-dimensional form line path. A vector swath offset (w, α) (as shown in FIG. 9) comprising a swath offset w due to, for example, the effective spraying width of boom assembly, and slope angle α, is also taken into account so that positions of field are not sprayed a second time. The computed new 3-dimensional form line may be used to generate guidance information for the operator of sprayer rig. For example, as the operator turns sprayer rig (as determined by new GPS position information received by GPS receiver 360, and new angle data collected by the tilt measurement device 392) is compared with its expected position (i. e., the second 3-dimensional form line information computed as described above). If the actual position agrees with the expected position, the operator is so advised, e.g., by the illumination of LED 374 in light bar 372, as depicted in FIG. 10. This process continues as sprayer rig is driven back across field with new GPS data/tilt angle data being constantly collected and the actual position of sprayer rig being constantly checked against its expected value. Using the deviations from the expected positions, the operator is provided with the display information so that the guidance corrections can be utilized as discussed above.

Referring still to FIG. 11, at step 418, the operator begins the next 3-dimensional form line. In general, the operator follows the guidance information computed by GPS receiver 360 and tilt measurement device 392 and displayed on moving map display 364 and heading indicator 370 and also on light bar 372. During this time, the operator may input corrections for obstacle avoidance or terrain features using steering wheel 380 or another steering control. Ultimately, the operator will finish the second 30-dimensional form line at step 422.

During process of following the guidance information provided by GPS receiver 360, and tilt measurement device 392, new GPS/tilt angle data is collected at step 424. The new GPS/tilt data will be used to provide guidance information as described above and will also form the basis for computing any subsequent 3-dimensional form line as was the case where the GPS/tilt data collected while following the first 3-dimensional form line was used to compute the second 3-dimensional form line. GPS/tilt data collection process for the second 3-dimensional form line ends at step 426. The subsequent 3-dimensional form line is computed based on the actual path traveled by sprayer rig and not just the expected path computed after the first 3-dimensional form line was computed. Thus, any deviations of sprayer rig from the computed second 3-dimensional form line, which were required due to the presence of rocks, trees, etc., will be reflected in the new GPS/tilt data and subsequent 3-dimensional form line will take into accounts these corrections.

At the step 428 the decision is made of whether a subsequent 3-dimensional form line is to be sprayed. If the answer is yes (logical arrow 429), the guidance information for the subsequent 3-dimensional form line is computed at step 430, with offset swath vector data being applied as before. These processes continue until the spraying operations for filed are completed at step 432 at which time the 3-dimensional form line following process 400 quits at step 434.

As was stated above, the 3-dimensional form line following information may be also provided by an external source, like a geographical information system (GIS). A GIS is a system of hardware, software and geographical data designed to support the capture, management, manipulation, analysis, modeling, and display of spatially reference data for solving complex planning and management problems. The main purpose of GIS is to find solutions to problems by using both geographical and tabular data. More specifically, GIS can include information relating to various soils, ownership, roads, streams, elevation, fields, and other data, all of which may be overlaid on a base map of field.

FIG. 12 depicts the flow chart 500 that illustrates the method of the present invention for guiding a vehicle in adjacent swaths across terrain that may slope. An example of such a terrain was shown above in FIG. 9 as an overhead view of a 3-dimensional field with curved spaying patterns. The method of the present invention for guiding a vehicle in adjacent swaths across terrain that may slope can be performed by using the disclosed above 3-dimensional form line following apparatus including a tilt-measurement unit (320 of FIG. 10).

In one embodiment of the present invention, the method for guiding a vehicle in adjacent swaths across terrain that may slope (500 of FIG. 12) comprises the following steps. At step 504, he tilt of the vehicle with respect to Earth due to a slope of the terrain is determined using the tilt measurement unit 380 of apparatus 320 of FIG. 10. At step 506, the position of a predetermined location that is fixed relative to the vehicle 320 (of FIG. 10) is determined using the navigational computer system 392 (of FIG. 10). In one embodiment of the present invention, the predetermined location is at ground level.

In another embodiment of the present invention, the vehicle includes a portion that is displaced from the predetermined locations and whose position with respect to the vehicle is known. For example, such a portion includes the implement (22 of FIG. 1). If this is the case, the decision test (508 of FIG. 500) is performed by using the computer system,392. In one embodiment, the result of the decision test is to determine the position of the implement with respect to Earth by determining the position of the implement with respect to Earth (step 520) and by performing a calculation (step 522) involving the tilt of the vehicle and the position of the implement with respect to both Earth and the vehicle 320. In one embodiment, the position of the implement is measured with respect to x and y coordinates axes that are horizontal and a z coordinate axis that is vertical.

Finally, at step 526, the tilt and position determinations are used to provide information for guiding the vehicle 320 (of FIG. 10) to prevent gaps and overlaps between adjacent swaths as the slope changes (for example, according to terrain of FIG. 9).

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of real time guiding a vehicle in adjacent swaths across terrain that may slope by using an optimum trajectory, said method comprising the steps of:

(A) determining in real GPS time the position with respect to Earth of a predetermined location that is fixed relative to the vehicle;

(B) synchronizing said position measurements performed in said step (A) with a GPS clock;

(C) determining the tilt of the vehicle with respect to Earth due to a slope of the terrain;

(D) synchronizing said tilt measurements performed in said step (C) with said GPS clock; and (E) using the tilt and position determinations to provide information in real time synchronized with said GPS clock for guiding the vehicle by using said optimum trajectory to prevent gaps and overlaps between adjacent swaths as the slope changes.

2. The method of claim 1, wherein said step (A) of determining in real GPS time the position with respect to Earth of said predetermined location further comprises:

using the tilt and position determinations.

3. The method of claim 1, wherein said predetermined location is at ground level.

4. The method of claim 1, wherein the vehicle includes a portion that is displaced from the predetermined locations and whose position with respect to the vehicle is known, and wherein the step (A) of determining in real GPS time the position with respect to Earth of the predetermined location further comprises the steps of:

determining in real GPS time the position of the displaced portion with respect to Earth.

5. The method of claim 1, wherein the position is measured with respect to x and y coordinates axes that are horizontal and a z coordinate axis that is vertical.

* * * * *